(12) United States Patent
Risvik

(10) Patent No.: US 6,377,945 B1
(45) Date of Patent: Apr. 23, 2002

(54) SEARCH SYSTEM AND METHOD FOR RETRIEVAL OF DATA, AND THE USE THEREOF IN A SEARCH ENGINE

(75) Inventor: Knut Magne Risvik, Trondheim (NO)

(73) Assignee: Fast Search & Transfer ASA, Oslo (NO)

( * ) Notice: Subject to any disclaimer, the term of this patent is extended or adjusted under 35 U.S.C. 154(b) by 0 days.

(21) Appl. No.: 09/486,726

(22) PCT Filed: Jul. 9, 1999

(86) PCT No.: PCT/NO99/00233

§ 371 Date: Mar. 9, 2000

§ 102(e) Date: Mar. 9, 2000

(87) PCT Pub. No.: WO00/03315

PCT Pub. Date: Jan. 20, 2000

(30) Foreign Application Priority Data

Jul. 10, 1998 (NO) ............................................ 19983175

(51) Int. Cl.⁷ .............................................. G06F 17/30
(52) U.S. Cl. ...................... 707/3; 707/5; 707/6; 707/7; 707/10; 707/513
(58) Field of Search ................................ 707/2–6, 102, 707/104.1; 704/9, 10

(56) References Cited

U.S. PATENT DOCUMENTS

| 5,412,807 A | * | 5/1995 | Moreland | .................... | 395/600 |
| 5,511,159 A | | 4/1996 | Baker et al. | ................. | 395/161 |
| 5,627,748 A | * | 5/1997 | Baker et al. | ................. | 395/792 |
| 5,724,571 A | * | 3/1998 | Woods | ........................ | 395/605 |

FOREIGN PATENT DOCUMENTS

| WO | 92/15954 | 9/1992 |
| WO | 96/00945 | 1/1996 |

OTHER PUBLICATIONS

E. M. McCreight "a Space–Economical Suffix Tree Construction Algorithm", Apr. 1976, Journal of the Association for Computing Machinery, vol.22, 262–272.*

R. S. Boyer "A Fast String Searching Algorithm", Oct. 1977, Communication ACM, vol. 20, 762–772.*

V. I. Levenstein, "Binary codes capable of correcting deletions, insertions, and reversals", (Russian) Doklady Akademii nauk SSSR, vol. 163, No. 4, pp. 845–848 (1965).

J. Kärkkäinen & E. Ukkonen, in "Sparse Suffix Trees", Proceedings of the Second Annular International Computing and Combinatorics Conference (COCOON '96), Springer Verlag, pp. 219–330.

D. R. Morrison, "PATRICIA—Practical Algorithm To Retrieve Information Coded in Alphaneumeric", Journal of the ACM, 15 pp. 514–534 (1968).

H. Shang & T.H. Merrettal, "Tries for Approximate String Matching", IEEE Transactions on Knowledge and Data Engineering, vol. 5, No. 4, pp. 540–547 (1996).

E. Ukkonen, "Finding Approximate Patterns in Strings", Journal of Algorithms, vol. 6, pp. 132–137 (1985).

* cited by examiner

Primary Examiner—Thomas Black
Assistant Examiner—Jacques Veillard
(74) Attorney, Agent, or Firm—Jacobson Holman, PLLC

(57) ABSTRACT

A search system for information retrieval includes a data structure in the form of a non-evenly spaced sparse suffix tree for storing suffixes of words and/or symbols, or sequences thereof, in a text T, a metric M including combined edit distance metrics for an approximate degree of matching respectively between words and/or symbols, or between sequences thereof, in the text T and a query Q, the latter distance metric including weighting cost functions for edit operations which transform a sequence S of the text into a sequence P of the query Q, and search algorithms for determining the degree of matching respectively between words and/or symbols, or between sequences thereof, in respectively the text T and the query Q, such that information R is retrieved with a specified degree of matching with the query Q. Optionally the search system also includes algorithms for determining exact matching such that information R may be retrieved with an exact degree of matching with the query Q.

14 Claims, 5 Drawing Sheets

SEARCH SYSTEM AND METHOD FOR RETRIEVAL OF DATA, AND THE USE THEREOF IN A SEARCH ENGINE

FIELD OF THE INVENTION

The present invention concerns a search system for information retrieval, particularly information stored in form of text, wherein a text T comprises words and/or symbols and sequences thereof S, wherein the information retrieval takes place with a given or varying degree of matching between a query Q, wherein the query Q comprises words and/or symbols q and sequences P thereof, and retrieved information R comprising words and/or symbols and sequences thereof from the text T, wherein the search system comprises a data structure for storing at least a part of the text (T), and a metric M which measures the degree of matching between the query Q and retrieved information R, and wherein the search system implements search algorithms for executing a search, particularly a full text search on the basis of keywords KW; and a method in a search system for information retrieval, particularly information stored in the form of text T, wherein a text T comprises words and symbols s and sequences S thereof, wherein the information retrieval takes place with a given or varying degree of matching between a query Q. wherein the query Q comprises words and/or symbols q and sequences P thereof, and retrieved information R comprising words and/or symbols and sequences thereof from the text T, wherein the search system comprises a data structure for storing at least a part of the text T, and a metric M which measures the degree of matching between the query Q and retrieved information R, and wherein the search system implements search algorithms for executing a search, particularly a full text search on the basis of keywords kw, wherein the information in the text T is divided into words and word sequences S, the words being substrings of the entire text separated by word boundary terms and forming a sequence of symbols, and wherein each word is structured as a sequence of symbols in the word forming sequence; and the use of the search system.

BACKGROUND OF THE INVENTION

A tremendous amount of information in various fields of human knowledge is collected and stored in computer memory systems. As the computer memory systems increasingly are linked in public available data communication networks, there has been an increasing effort to develop systems and methods for searching and retrieving information for public or personal use. Present search methods for data have, however, limitations that seriously reduce the possibility of retrieving efficiently and using information stored in this manner.

Information may be stored in the form of different data types, and in the context of information search and retrieval it will be useful to discern between dynamic data and static data. Dynamic data is data that change often and continuously, so that the set of valid data varies all the time, while static data only changes very seldom or never at all. For instance will economic data, such as stock values, or meteorological data be subject to very quick changes and hence dynamic. On the other hand archival storage of books and documents are usually permanent and static data. The concept the volatility of the data relates to how long the information is valid. The volatility of data has some bearing upon how the information should be searched and retrieved. Large volumes of data require some structure in order to facilitate searching, but the time cost of building such structures must not be higher than the time the data is valid. The cost of building a structure is dependent on the data volume and hence the building of data structures for searching the information should take both the data volume and the volatility into consideration. The information collected are stored in databases and these may be structured or unstructured. Moreover, the databases may contain several types of documents, including compound documents which contain images, video, sound and formatted or annotated text. Particularly structured databases are usually furnished with indexes in order to facilitate searching and retrieving the data. The growth of the World Wide Web (WWW) offers a steadily growing collection of compound and hyperlinked documents. A great many of these are not collected in structured databases and no indexes facilitating rapid searching are available. However, the need for searching documents in the World Wide Web is obvious and as a result a number of so-called search engines has been developed, enabling searching at least parts of the information in the World Wide Web.

With a search engine it is commonly understood one or more tools for searching and retrieving information. In addition to the search system proper, a search engine also contains an index, for instance comprising text from a large number of uniform resource locators (URLs). Examples of such search engines are Alta Vista, HotBot with Inktomi technology, Infoseek, Excite and Yahoo. All these offer facilities for performing search and retrieval of information in the World Wide Web. However, their speed and efficiency do by no means match the huge amount of information available on the World Wide Web and hence the search and retrieval efficiency of these search engines leaves much to be desired.

Searching a large collection of text documents can usually be done with several query types. The most common query type is matching and variants of this. By specifying a keyword or set of keywords that has to be present in the queried information the search system retrieves all documents that fulfils this requirement. The basic search method is based on so-called single keyword matching. The keyword p is searched for and all documents containing this word shall be retrieved. It is also possible to search for a keyword prefix $p_j$ and all documents where this prefix is present in any keyword in the documents, will be retrieved. Instead of searching with keywords, the search is sometimes based on so-called exact phrase matching, where the search uses several single keywords in particular sequence. As well-known by persons skilled in the art, the exact matching of keyword phrases in many search systems may be done with the use of Boolean operators, for instance based on operators such as AND, OR, and NOT which allow a filtering of the information; e.g. using an AND phrase results in that all documents containing the two keywords linked by the AND operator will be returned. Also a NEAR operator has been used for returning just the documents with the keywords matching and located "near" to each other in the document text. In many structured database the documents contained in the database have been annotated, e.g. provided with fields which denote certain parts or types of information in the document. This allows the search for matches in only parts of the documents and is useful when the type of queried information is known in advance.

When searching in text documents the data are structured and most likely present in some natural language, like English, Norwegian etc. When searching for documents with a certain context it is possible to apply proximity metrics for matching keywords or phrases that match the query approximately. Allowing errors in keywords and phrases are common method for proximity, using a thesaurus is another common method. A proximity search requires only that there shall be a partial match between the information retrieved and the query. International published application WO96/00945 titled "Variable length data sequence matching method and apparatus" (Döringer & al.) which has been assigned to International Business Machines, Corp., discloses the building, maintenance and use of a database with a trie-like structure for storing entries and retrieving at least a partial match, preferably the longest partial match or all partial matches of a search argument (input key) from the entries.

SUMMARY OF THE INVENTION

The main object of the present invention is to provide a search system and a method for fast and efficient search and retrieval of information in large volumes of data. Particularly it is an object of the present invention to provide a search system suited for implementing search engines for searching of information systems with distributed large volume data storage, for instance Internet. It is to be understood that the search system according to the invention by no means is limited to searching and retrieving information stored in the form of alphanumeric symbols, but equally well may be applied to searching and retrieving information stored in the form of digitalized images and graphic symbols, as the word text used herein also may interpreted as images when these are represented wholly or partly as sets of symbols. It is also to be understood that the search system according to the invention can be implemented as software written in a suitable high-level 'language on commercially available computer systems, but it may also be implemented in the form of a dedicated processor device for searching and retrieving information of the aforementioned kind.

The above-mentioned objects and advantages are realized according to the invention with a search system which is characterized in that the data structure comprises a tree structure in the form of a non-evenly spaced sparse suffix tree ST(T) for storing suffixes of words and/or symbols s and sequences S thereof in the text T, that the metric M comprises a combination of an edit distance metric D(s,q) for an approximate degree of matching between words and/or symbols s;q in respectively the text T and a query Q and an edit distance metric $D_{ws}(S,P)$ for an approximate degree of matching between sequences S of words and/or symbols s in the text T and a query sequence P of words and/or symbols q in the query Q, the latter edit distance metric including weighting cost functions for edit operations which transform a sequence S of words and/or symbols s in the text T into the sequence P of words and/or symbols q in the query Q, the weighting taking place with a value proportional to a change in the length of sequence S upon a transformation or dependent on the size of the words and/or symbols in sequences S;P to be matched, that the implemented search algorithms comprise a first algorithm for determining the degree of matching between words and/or symbols s;q in the suffix tree representation of respectively the text T and a query Q, and a second algorithm for determining the degree of matching between sequences S;P of words and/or symbols s;q in the suffix tree representation of respectively the text T and the query Q, said first and/or second algorithms searching the data structure with queries Q in the form of either words, symbols, sequences of words or sequences of symbols or combinations thereof, such that information R is retrieved on the basis of query Q with a specified degree of matching between the former and the latter, and that the search algorithms optionally also comprise a third algorithm for determining exact matching between words and/or symbols s;q in the suffix tree representation of respectively the text T and the query Q and/or a fourth algorithm for determining exact matching between sequences S;P of words and/or symbols s;q in the suffix tree representation of respectively the text T and the query Q, said third and/or fourth algorithms searching the data structure with queries Q in the form of either words, symbols, sequences of words, or sequences of or combinations thereof, such that information R is retrieved on the basis of the query Q with an exact matching between the former and the latter.

In an advantageous embodiment of the search system according to the invention the suffix tree ST(T) is a word-spaced sparse suffix tree $SST_{ws}(T)$, comprising only a subset of the suffixes in the text T.

The above-mentioned objects and advantages are also realized according to the invention with a method which is characterized by generating the data structure as a word-spaced sparse suffix tree $SST_{ws}(T)$ of a text T for representing all the suffixes starting at a word separator symbol in the text T, storing sequence information of the words s in the text T in the word-spaced sparse suffix tree $SST_{ws}(T)$, generating a combined edit distance metric D(s,q) for words s in the text T and a query word q in a query Q and a word-size dependent edit distance metric $D_{ws}(S,P)$ for sequences S of words s in the text T and a sequence P of words q in the query Q, the edit distance metric $D_{ws}(S,P)$ being the minimum sum of costs for edit operations transforming a sequence S into the sequence P, the minimum sum of costs being the minimum sum of cost functions for each edit operation weighted by a value proportional to the change in the total length of the sequence S or by the ratio of the current word length and average word length in the sequences S;P, and determining the degree of matching between words s,q by calculating the edit distance D(s,q) between the words s of the retrieved information R and the word q of a query Q, or in case the words s,q are more than k errors from each other, determining the degree of matching between the word sequences $S_R$; $P_Q$ of retrieved information R and a query Q respectively by calculating the edit distance $D_{ws}(S_R,P_Q)$ for all matches.

Advantageously the method according to the invention additionally comprises weighting an edit operation which changes a word s into word q with a parameter for the proximity between the characters of the words s;q, thus taking the similarity of the words s;q in regard when determining the cost of the edit operation in question.

In the method according to the invention the number of matches is limited by calculating the edit distance $D_{ws}(S_R, P_Q)$ for restricted number of words in the query word sequence $P_Q$.

In another advantageous embodiment of the method according to the invention the edit distance D(s,q) between word s and a word q is defined recursively and calculated by means of a dynamic programming procedure; and the edit distance $D_{ws}(S,P)$ between sequences S and a sequence P is correspondingly recursively defined and calculated by means of a dynamic programming procedure.

The above-mentioned objects and advantages are also realized with the use of the search system according to the invention in an approximate search engine.

BRIEF DESCRIPTION OF THE DRAWINGS

The search system and the method according to the invention shall now be discussed in greater detail in the following with reference to the accompanying drawing figures, of which

DETAILED DESCRIPTION OF THE PREFERRED EMBODIMENTS

Figure 1:
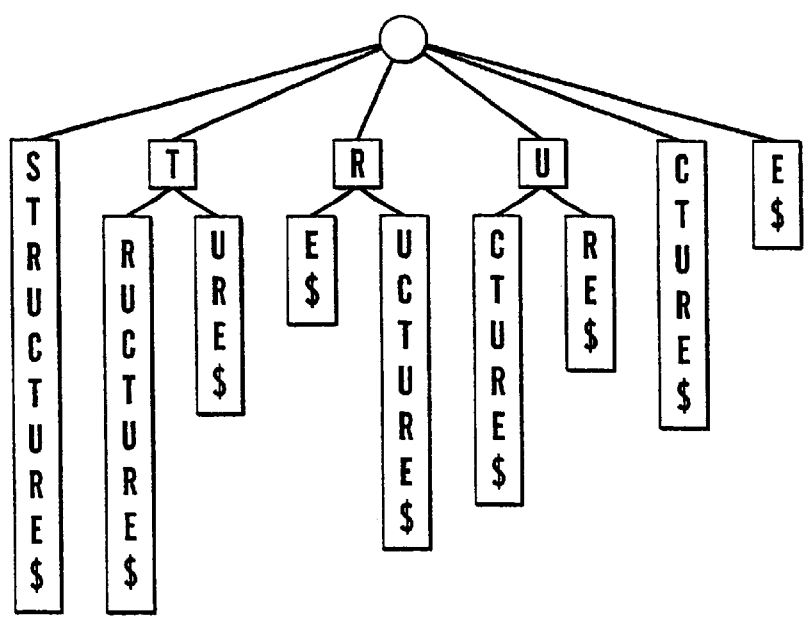
FIG. 1 shows an example of a suffix tree, FIG. 2 examples of word-spaced sparse suffix trees as used with the present invention, FIG. 3 an example of a so-called PATRICIA trie as known in prior art, FIG. 4 a further example of a word-spaced sparse suffix tree as used with the present invention, FIG. 5 an example of explicitly stored word sequence information as used with the present invention, FIG. 6 a leaf node structure as used with the present invention, and FIG. 7 schematically the structure of a search engine with the search system according to the present invention.

The search system according to the invention consists essentially of three parts, namely the data structure, the metrics for approximate matching and the search algorithm. When full text retrieval is the target, as essentially will be the case with the search system according to the present invention, then the entire data set which shall be retrievable, will be stored in a data structure which supports a high query performance.

The basic concepts underlying the present invention shall first be discussed in some detail. Stored information in the form of text T is divided into words s and word sequences S. Words are substrings of the entire text separated by word boundary terms. The set of word boundary terms is denoted $BT_{word}$. A common set of word boundary terms could be the set $\{", ':', '\t', '\n', '0', '.', ';', '?'\}$ where \t denotes a tab character, \n denotes a linefeed character and \0 denotes an end-of-document indicator. In connection with the following description of the present invention it will be useful with some definitions concerning strings and sequences.

Definition 1: String

A string is a sequence of symbols taken from an alphabet, such as the ASCII characters. Then the length of a string is the number of instances of symbols or characters comprising the string, and is denoted $|x|$. If x has the length m the string may also be written as $x_1 x_2 \ldots x_i \ldots x_m$, where $x_i$ represents the ith symbol in the string.

A substring of x is a string given by a contiguous group of symbols within x. Thus, a substring may be obtained from x by deleting one or more characters from the beginning or the end of the string.

Definition 2: Substring, Suffix and Prefix

A substring of x is a string $x_i^j = x_i x_{i+1} x_j$ for some $1 \leq i \leq j \leq n$. The string $x_i = x_i^n = x_i \ldots x_n$ is a suffix of string x and the string $x_j = x_1^j = x_1 x_2 \ldots x_j$ is a prefix of string x.

Also the notion of a word sequence will be used.

Definition 3: Word Sequence

A word sequence is a sequence of separated, consecutive words. A word sequence $S = s_1, s_2, \ldots, s_n$ consists of n single words (or strings) $s_1, s_2,$ up to $s_n$.

Word sequences are delimited by sequence boundary terms. The set sequence boundary terms are denoted $BT_{seq}$. A common set of sequence boundary terms could be the set $\{'0\backslash'\}$, where \0 indicates an end-of-document marker.

The concept approximate word matching can be described as follows.

Given a string $s = s_1 s_2 \ldots s_n$ and a query term $q = q_1 q_2 \ldots q_m$. Then the task is to find all occurrences of q in s that is at most k errors away from the original query term q. A proximity metric determines how to calculate the errors between q and a potential match $s_i \ldots s_j$.

A common metric for approximate word matching is the Levenstein distance or edit distance (V. I. Levenstein, "Binary codes capable of correcting deletions, insertions, and reversals", (Russian) Doklady Akademii nauk SSSR, Vol. 163, No. 4, pp. 845–8 (1965); also Cybernetics and Control Theory, Vol. 10, No. 8, pp. 707–10, (1966)). This metric is defined as the minimum number of edit operations needed to transform one string into another. An edit operation is given by any rewrite rule, for instance:

(a→ε), deletion (ε→a), insertion (a→b), change

Let p and m be two words of size i and j, respectively. Then D(i,j) denotes the edit distance between the ith prefix of p and the jth prefix of m. The edit distance can then recursively be defined as:

$$D(i,0) = D(0,i) = i$$

$$D(i, j) = \min \begin{cases} D(i-1, j) + 1 \\ D(i, j-1) + 1 \\ D(i-1, j-1) + \partial(i, j) \end{cases} \quad (1)$$

where $$\partial(i,j) = 0 \text{ if } p_i = m_j \text{ else } 1$$

It is also possible to define an approximate matching on the level of words in a word sequence and this can be described as follows.

Given a text T consisting of the n words $w_1, w_2 \ldots w_n$ where each of the words is a string of characters. A sequence pattern P consists of the m words $p_1, p_2, \ldots, p_m$. The sequence pattern P is said to have an approximate occurrence in T if the sequence $p_1, p_2, \ldots p_m$ differs with at most k errors from a sequence $w_i, w_{i+1}, \ldots, w_j$ for some i,j, such that $1 \leq i \leq j \leq n$. Again, a proximity metric determines how to calculate the number of errors between the two sequences.

A text that shall be retrieved in a search system must be indexed in a manner which facilitates searching the data. Consequently the data structure is a kernel data structure of the search system according to the present invention and is based on so called suffix trees and particularly a sparse suffix tree. These two kinds of structures shall be defined in the following. A suffix tree S(T) is a tree representation of all possible suffixes in the text T. All unary nodes in a suffix tree S(T) are concatenated with its child to create a compact variant.

FIG. 1 shows the suffix tree for the text T="structure".

Even more particularly the present invention is based on sparse suffix trees. These were introduced by J. Kärkkäinen & E. Ukkonen, in "Sparse Suffix Trees", Proceedings of the Second Annual International Computing and Combinatorics Conference (COCOON '96), Springer Verlag, pp.219–230, which again was based on ideas published by D. R. Morrison, "PATRICIA—Practical Algorithm To Retrieve Information Coded in Alphanumeric", Journal of the ACM, 15, pp. 514–534 (1968). A sparse suffix tree is defined as follows.

Definition 4: Sparse Suffix Tree

A sparse suffix tree SST(T) of the text T is a suffix tree, containing only a subset of the suffixes present in the suffix tree ST(T) of the text.

When using the search system according to the present invention searching for entire words, advantageously a non-evenly spaced sparse suffix tree may be created by storing suffixes starting at word boundaries only. The concept words-spaced sparse suffix tree is defined as follows.

Definition 5: Word-spaced Sparse Suffix Tree

A word-spaced sparse suffix tree $SST_{w-s}(T)$ of a text T is a sparse suffix tree SST(T) containing only the suffixes starting at a word separator character in the text.

Figure 2:
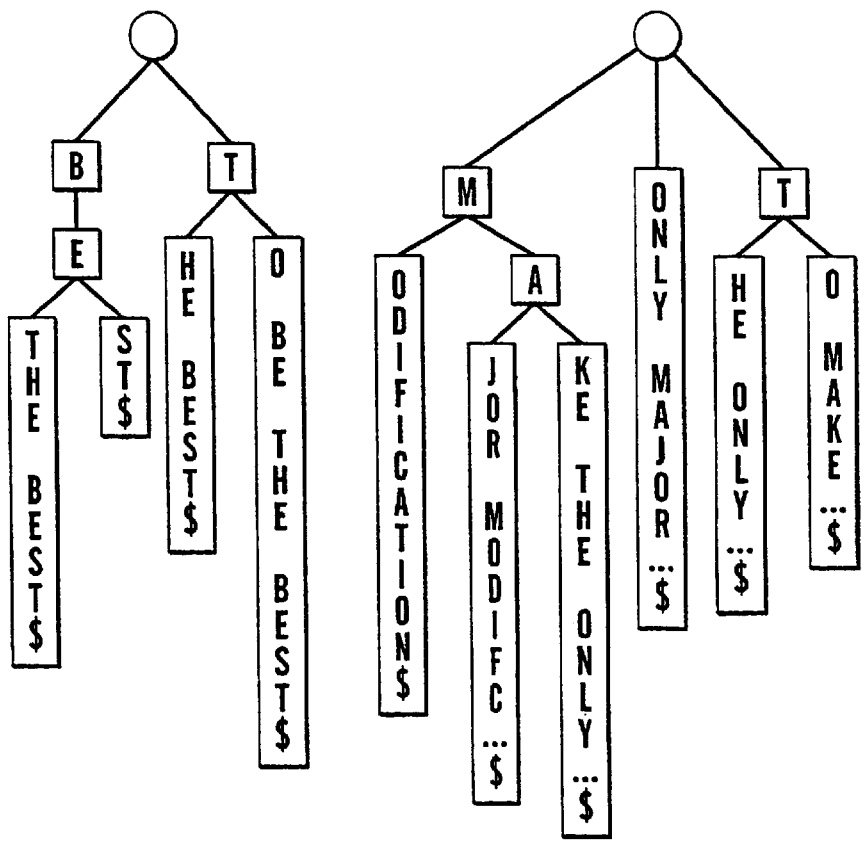

FIG. 2 shows two examples of word-spaced sparse suffix trees. Parts of the suffixes have been omitted to enhance the readability. The word-spaced sparse suffix tree for T="to be the best" is the left structure, and T="to make the only major modification" is the right structure in FIG. 2.

Figure 3:
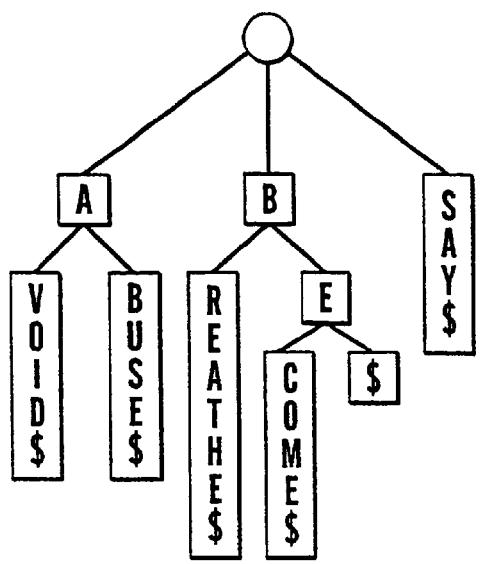
Figure 4:
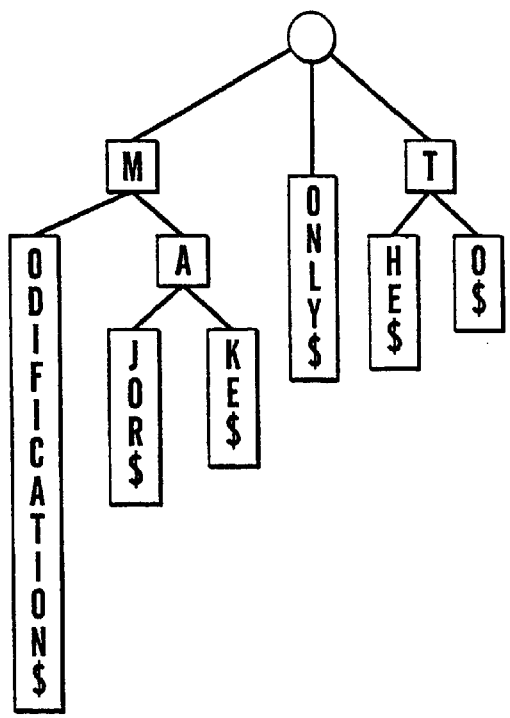

In the search system of the present invention the text is naturally divided into words which are stored independently in the word-spaced sparse suffix tree. As the atomic search term for searching is the word itself, advantageously each suffix will be terminated at the end of the word. This reduces the sparse suffix tree to a so-called PATRICIA trie (Morrison, op.cit.). A trie as defined in the literature is a rooted tree with the properties that each node, except the root, contains a symbol of the alphabet and that no two children of the same node contain the same symbol. It should be noted that the word trie derives from the word "retrieval" and hence indicates that the trie is a tree structure suitable for retrieval of data. A PATRICIA trie is defined as a keyword spaced sparse suffix tree (KWS tree) where the suffixes stored in the leaf nodes are limited by keyword delimiters. An example of a PATRICIA trie for the set of keywords {"avoid", "abuse", "be", "become", "breathe", "say"} is shown in FIG. 3. The structure used in the search system of the present invention differs from the PATRICIA trie because the search system explicitly stores sequence information of the words. Reducing the suffix length requires that the representation of the leaf node is changed. Pointers to the original text are replaced by the suffix string itself. A suffix length reduction of this kind is shown in FIG. 4 for one of the strings shown in FIG. 2. In other words FIG. 4 shows the word spaced sparse suffix tree for T="to make the only major modification" and with suffixes cut off at word boundaries. A leaf node will contain a list of all positions where the word represented by the leaf node occurs.

Instead of using the implicit sequence of information found in the original text, the present invention explicitly stores sequence information in the word-spaced sparse suffix tree. This is done by using pointers between the leaf nodes that represent consecutive words in the original text. As at least all the occurrences of the word represented by a particular leaf node are available, a pointer must be added to the next consecutive leaf.

Figure 5:
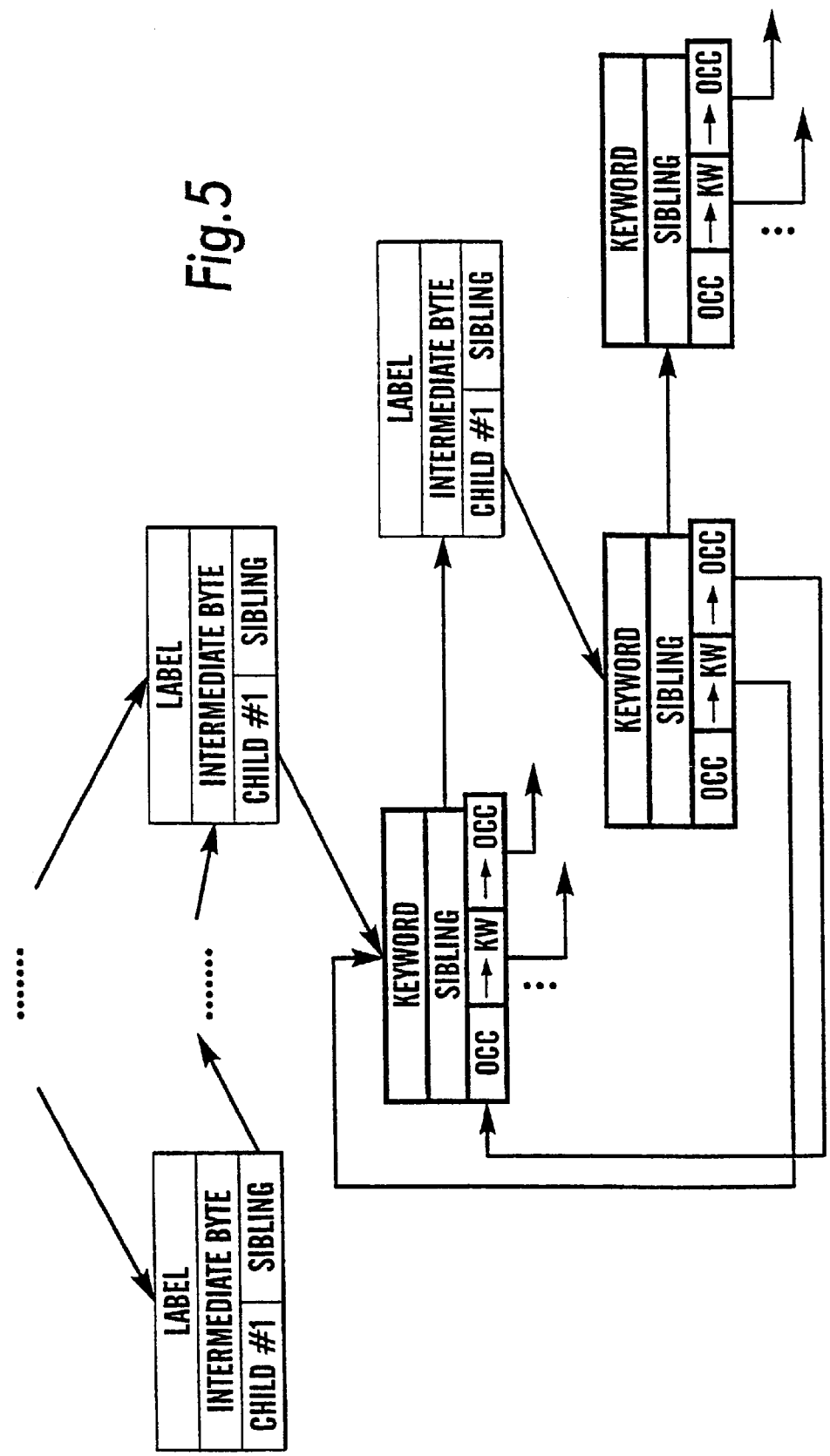

A leaf node contains only the suffix of the word it represents, so when traversing the sequence pointers in the occurrence list only the suffixes of each of the consecutive words are revealed. This is handled by storing the entire word in the leaf node instead of just the suffix and thus also data structure of the invention differs from the PATRICIA trie in this respect. The data structure for explicitly stored word sequence information with an occurrence list with pointers to the next consecutive word and to its occurrence is shown in FIG. 5.

Figure 6:
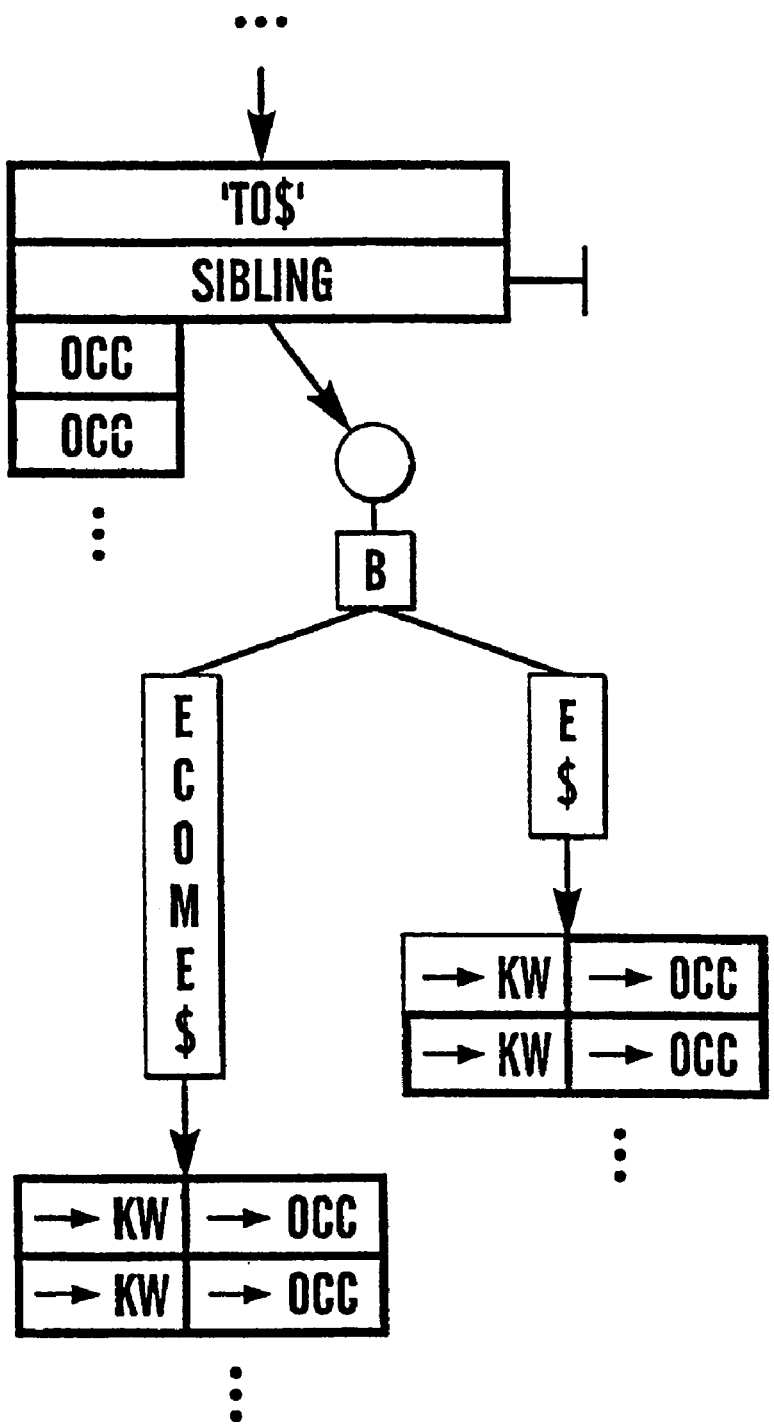

The search system according to the present invention uses a PATRICIA trie for organizing the occurrence list (Morrison, op.cit.). The PATRICIA trie enables the search system to access the list of all consecutive words matching the string $p_2$ in a time $O(|p_2|)$, where $|p_2|$ of course is the length of $p_2$. By using a PATRICIA trie to organize the list of occurrences, a completely defined tree structure is obtained for storing words from a text and maintaining the sequence information. A typical leaf node, with both a PATRICIA trie for the organized occurrence list and the extra unsorted list of occurrences, is shown in FIG. 6. As an example the memory requirement for an occurrence list as used in the search system of the present invention, a database with about 742358 documents has a total of 333 856 744 words and a lexicon of 538 244 distinct words. The total size of the database is 2054.52 MB. The average word length is thus 6.45 bytes. A sparse suffix tree will use 8 bytes for each internal node, using 32 bit pointers. It is assumed that an average of 3 internal nodes is used for each word. The leaf node would then require 6.45 bytes for storing the entire word plus 32 bits for a pointer to an occurrence list. A total of 34.45 bytes/word gives a total size of 18.108 MB. In addition the occurrence list has the size of 4 bytes per entry and 12 bytes if the full version is to be used. Hence the total memory requirement of the occurrence list varies from 1273 MB to 3820 MB. The data structure using a sparse suffix tree will have a size between 60% to 200% of the original text. This is comparable with the requirements of an inverted file, but the sparse suffix tree as used in the search system according to the invention provides much faster searching, enables approximate matching and makes sequence matching easy to perform.

In approximate searching, a metric is used to give an error measure of a possible match. The search system according to the present invention employs several metrics, and particularly a unique combination of metrics. These metrics along with the combined metric shall be discussed in the following.

An edit distance metric as defined above allows the operations deletion, insertion and change which intuitively apply to words as well as characters. Common errors in matching phrases are missing, extra or changed words. Hence the edit distance metric as previously defined shall be adapted and extended in order to apply to the approximate word sequence matching problem. Edit operations for sequences are defined below.

Definition 6: Edit Operations for Sequences

For transforming one sequence S of words into another sequence P of words, the edit operations allowed on the word in the sequences may be written according to the following rewrite rules:

(a→ε), deletion of word a from the sequence (ε→a), insertion of word a into the sequence (a→b), change of word a into word b (ab→ba), transposition of adjacent words a and b.

Instead of characters as atoms, the search system according to the invention applies the edit operations to words which then should be regarded as the operational atoms.

A cost function $c_{edit}(x \rightarrow y)$ is a constant which is defined as $$c_{edit}(x \rightarrow y) = \begin{cases} 1 & \text{delete} \\ 1 & \text{insert} \\ 1 & \text{transpose} \\ \partial(x, y) & \text{change} \end{cases} \quad (2)$$

where $\partial(x,y)$ is defined as $$\partial(x, y) = \begin{cases} 0 & x = y \\ 1 & \text{else} \end{cases} \quad (3)$$

By using the edit operations as defined above the edit distance for sequences can now be defined.

Definition 7: Edit Distance for Sequences

The edit distance metric for sequences defines the distance $D_{seq}(S,P)$ between the sequence $S=s_1,s_2,\ldots,s_n$ and the sequence $P=p_1,p_2,\ldots,p_m$ as the minimum sum of cost $c(x \rightarrow y)$ for the sequence of edit operations transforming the sequence S into the sequence P.

The search system according to the present invention enhances the edit distances metric for sequences to weight the cost of the edit operations by the size of the words operated upon.

Definition 8: Word Size-dependent Edit Distance for Sequences

The word size dependent edit distance for sequences is defined as the minimum sum of costs for the editing operations needed to transform one sequence into the other. The cost functions are dependent on the word size of its operands.

In the search system according to the invention a definition of cost functions is given by the equations $$c_{insert}(\varepsilon \rightarrow a) = \frac{|a|}{l} \quad (4)$$

$$c_{delete}(a \rightarrow \varepsilon) = \frac{|a|}{l}$$

$$c_{transpose}(ab \rightarrow ba) = 1$$

$$c_{change}(a \rightarrow b) = \frac{\max(||a|-|b||, l)}{l}$$

where l denotes the average length of a word in the two sequences being compared. The cost of each edit operation is weighted by a value proportional to the change in the total length of the sequence or by the ratio of the current word length and the average word length in the sequences considered.

Now the distance metric reflects the assumption of some relation between the word length and how important the word is to the semantic context of the word sequence. Furthermore the search system according to the invention employs proximity at the character level when the change edit operation (a→b) is used. Replacing a word a by another word b should be related to the similarity between these two words. The new cost function for the change edit operation hence is given as:

$$c_{change}(a \rightarrow b) = \partial_{approx}(a, b) \frac{\max(||a|-|b||, l)}{l} \quad (5)$$

where $$\partial_{approx}(a,b) = D(a,b) \quad (6)$$

Where $D(a,b)$ is the normalized edit distance measuring function for words, 0 means full similarity, 1 means no similarity.

The search system according to the invention combines the edit distance metric for sequences with the cost functions as given by formulas (4), (5) and (6), with an edit distance metric for words as given by formula (1). This means that sequence edit operations are only used when the words being matched are more than k errors away from each other.

The algorithms used in the search system according to the invention perform efficient searching of the described structures. Matches are found according to the metrics as given above.

Approximate word matching in a word-spaced sparse suffix tree is done by combining the calculation of the edit distance matrix and a traversal of the suffix tree. An algorithm for this is written in pseudo-code and given in table I.

This algorithm is adapted from a trie-matching algorithm as proposed by H. Shang & T. H. Merrettal, "Tries for Approximate String Matching", IEEE Transactions on Knowledge and Data Engineering, Vol.5, No. 4, pp. 540–547 (1996). The expected worst case running time of the algorithm is $O(k|\Sigma|^k)$ according to Shang & Merrettal (op.cit.).

Approximate word sequence matching requires the calculation of the word sequence edit distance for all possible matches. However, the number of possible matches can be limited by starting the calculation of the edit distance only on the possible words. The cost of deleting a word from the sequences determines the number of possible start words. If the accumulated cost of deleting the i first words in a query sequence $P_Q$ rises above a given error threshold, the candidate sequence starting with the ith word of the query cannot possibly be a match. Therefore for a query sequence $P_Q$ of i words, at most i possible start words will be tried. Since there are no backpointers in the sequence structure of the tree, it will not be ensured that all possible matches are obtained. Adding backpointers would solve this problem. The algorithm for approximate word sequence matching as used in the search system according to the present invention, is given in pseudo-code in table II below. This algorithm tries to match the first keyword with $P_1, P_2 \ldots$ sequentially, testing all possible start positions.

In the ApproxSequenceMatch algorithm in table II the ApproxMatchRest function is defined by the algorithm in table III below. This function matches the remaining sequence, using an initial error value.

TABLE I

```
FindApproximate   (root,p,k)
    node ← root;
    i ← 1;
    nodes ← Children (node);   // A stack of nodes
    for all v ∈ nodes do
        if IsLeaf (v) then
            for j ← i to length (Suffix(node)) do
                W_j ← Suffix(node)_{j-i};
                if w_j = '$' then      //'$' is a stopchar
                    output w_{1...j};
                    return;
```

TABLE I-continued

```
            if EditDist (i) = ∞ then
                break;
            else        //Internal node
                i ← i+1;
                w_i ← label (v)
                if EditDist (i) = ∞ then
                    break;
                nodes ← Children (v) ∪ nodes;
        // end for
    EditDistance(j)      // Calculates jth row
        for i← 1 to length (P) do
            if p_i = w_j then ∂ ← 0 else ∂ ← 1;
            c_1 = D[i-1,j] + c_ins(m_j);
            c_2 = D[i,j-1] + c_del(i);
            c_3 = D[i-1,j-1] + c_change(p_i,m_j);
            c_4 = D[i-2,j-2] + c_transpose(p_i,m_j-1);
            D[i,j] ← c_fraction(j/l)· min(c_1,c_2,c_3,c_4);
            if D[i,j] > k
                return ∞; //No distance below k
            return D[i,j]
```

TABLE II

```
ApproxSequenceMatch_ED (root, P(=p_1,p_2, . . . ,P_m),k)
    m ← |p|
    matches ← ∅
    startError ← 0
    startIndex ← 1
    while startError ≦ k OR startIndex ≦ m do
        startNode ← FindExact (p_startIndex);
        list ← UnorderedOccurrenceList (startNode);
        for all v ∈ lists do
            if ApproxMatchRest2 (v,P,k,startError) then
                matches ← ∪ v;
        startError ← startError + c_del (p_startIndex);
        startIndex ← startIndex + 1;
```

TABLE III

```
ApproxMatchRest (u,P,K,startError)
    error ← startError;
    lastError ← startError;
    column ← 0 ;
    node ← u;
    for v ← p_2 to p_|p| do
        node ← NextOccurrence(node);
        word ← Keyword(node);
        lastError ← error;
        error ← startError + EditDistance (column);
        if error > k AND lastError > k then
            return false;
    return true;
    EditDistance(j)      // Calculates jth row
        for i← 1 to length (P) do
            if p_i = w_j then ∂ ← 0 else ∂ ← 1;
            c_1 = D[i-1,j] + c_ins (m_j);
            c_2 = D[i,j-1]+ c_del (p_i)
            c_3 = D[i-1,j-1] + c_change (p_i,m_j);
            c_4 = D[i-2,j-2] + c_transpose (p_i,m_j-1) ;
            D[i,j] ← c_fraction(j/l) · min (c_1, c_2, c_3, c_4);
            if D[i,j] > k
                return ∞; // No distance below k
            return D[i,j]
```

The algorithms in tables II and III are written in the same pseudo-code as the algorithm in table I.

The FindExact function used to find the leaf node matching the first word in the sequence performs a simple traversal of the tree and its running time is $O|p_1|$ where $p_1$ denotes the first word in a query sequence $P_Q$. Calculating the edit distance can be done in $|P|^2$ time using straightforward dynamic programming or in $O(k)$ time (where k denotes the error threshold) using improved versions of the calculation algorithm, see E. Ukkonen, "Finding Approximate Patterns in Strings", Journal of Algorithms, vol. 6, pp. 132–137 (1985).

If $\Sigma n_{occ}(p_i)$ denotes the total sum of the number of occurrences of each word $p_i$ in the word sequence, then the worst case running time is $O(k\Sigma n_{occ}(p_i))$.

Finally the implementation of a search engine based on the search system according to the invention shall briefly be discussed. Particularly a search engine based on the search system according to the invention is implemented as an approximate search engine (ASE) and is intended as a search engine for indexing large document collections and providing algorithms for exact and approximate searching of these document collections. ASE shall provide a data structure for storing large texts or collection of documents. It is to be understood that the data structure may be generated from documents which contain additional information, such as images, video, sound, and the text may be formatted and/or annotated. The data structure is identical to the word-spaced sparse suffix tree as discussed above and it is, of course, to be understood that the words is the keywords of the search system, hence the word-spaced sparse suffix tree may instead be termed a keyword-spaced sparse suffix tree (KWS tree). The ASE shall contain algorithms for indexing documents in the KWS tree. These algorithms, of course, do not form a part of the search system according to the present invention, but they are well-known to persons skilled in the art and described in the literature, see for instance J. Kärkkäinen & E. Ukkonen (op.cit.) and D. R. Morrison (op.cit).

The search system according to the invention and as used in the ASE employs algorithms both for exact and approximate matching of a pattern in a KWS tree. The algorithms given above in table I and table II are used for approximate word and word sequence matching with the non-uniform edit distance as a metric. Finding an exact match of keyword p with length m in a KWS tree is known in the art and easily implemented as a simple traversal of the tree structure. An appropriate algorithm for exact keyword matching written in pseudo-code is given in table IV. The search system according to the invention also shall be able to support algorithms for exact keyword sequence matching. Algorithms for exact keyword sequence matching are known in the art and easily implemented as e.g. shown in pseudo-code in table V below. The algorithm given here will find the exact match of the first keyword, if any. Then it will for all occurrences of the first keyword check if the second keyword matches the second keyword of the query. If so, the MatchRest procedure in table V is used to determine if the occurrence of the two first keywords are matching in the entire sequence. For approximate keyword matching in a KWS tree the search system implements the algorithm in table I above. For approximate keyword sequence matching the search system implements the algorithm in table II above, matching a first keyword sequentially with $p_1, p_2 \ldots$ and testing all possible start positions, applying the ApproxMatchRest function as given in table III to match a sequence starting at a particular position and handle the initial error value.

Finally, the ASE shall need a simple front end which gives the user control of indexing and querying the document collection. The front end should also be able to furnish statistics of the document collection and provide both a network interface for remote access, e.g. via WWW, and a local server user interface.

The ASE with the search system according to the invention should be general in a manner that allows for the adding new indexing and searching algorithms easily. Also, storing extra information about each document or keyword shall be possible to implement in an easy manner. Particularly the front end should be independent of the data structure and the search algorithms, such that internal changes in these has no effect on the design of the former.

The use of the search system according to the invention the ASE should be designed to have as low memory overhead as possible in the data structure. Also, searching should be designed to be as fast as possible. However, there will usually be a trade-off between these two factors.

TABLE IV

FindExact (rcot,p)
   i ← 1;
      node ← Find Child (root,$p_i$);
      while node AND i ≦ length (p) do
         if IsLeaf(node) AND Suffix(node) = $P_i \ldots P_m$ then
            return node;
         i ← i+1
         node ← FindChild (node, $p_i$);
      return NIL:

TABLE V

MatchSequenceExact (P, root)
   matches ← ∅;
   v ← FindExact ($p_1$,root);
   if |P| > 1 then
      if v ≠ NIL then
         list ← UnorderedOccurrenceList (v);
         for all u ∈ list do
            if NextKeyword(u) = $p_2$ then
               if MatchRest ($p_3 \ldots p_m$,u) then
                  matches ← matches ∪ Occurrence(u);
   return matches;
MatchRest (P,u)
   node ← u;
   for v ← $p_i$ to $p_{|P|}$ do
      node ← NextOccurrence(node);
      word ← Keyword(node);
      if v ≠ word then
         return false;

To sum up, an ASE with a search system according to the invention shall comprise four major modules.
1. Document indexing module DIM for indexing documents in the KWS tree structure. This module should also contain all extensions to support several document types.
2. Data storage module DSM based on a keyword-spaced sparse suffix tree (KWS tree).
3. Search algorithm module SAM for searching the KWS tree, comprising algorithms for exact and/or approximate matching of respectively words and word sequences.
4. User interface front-end module FEM comprising both a local server user interface and a network interface for remote queries.

Figure 7:
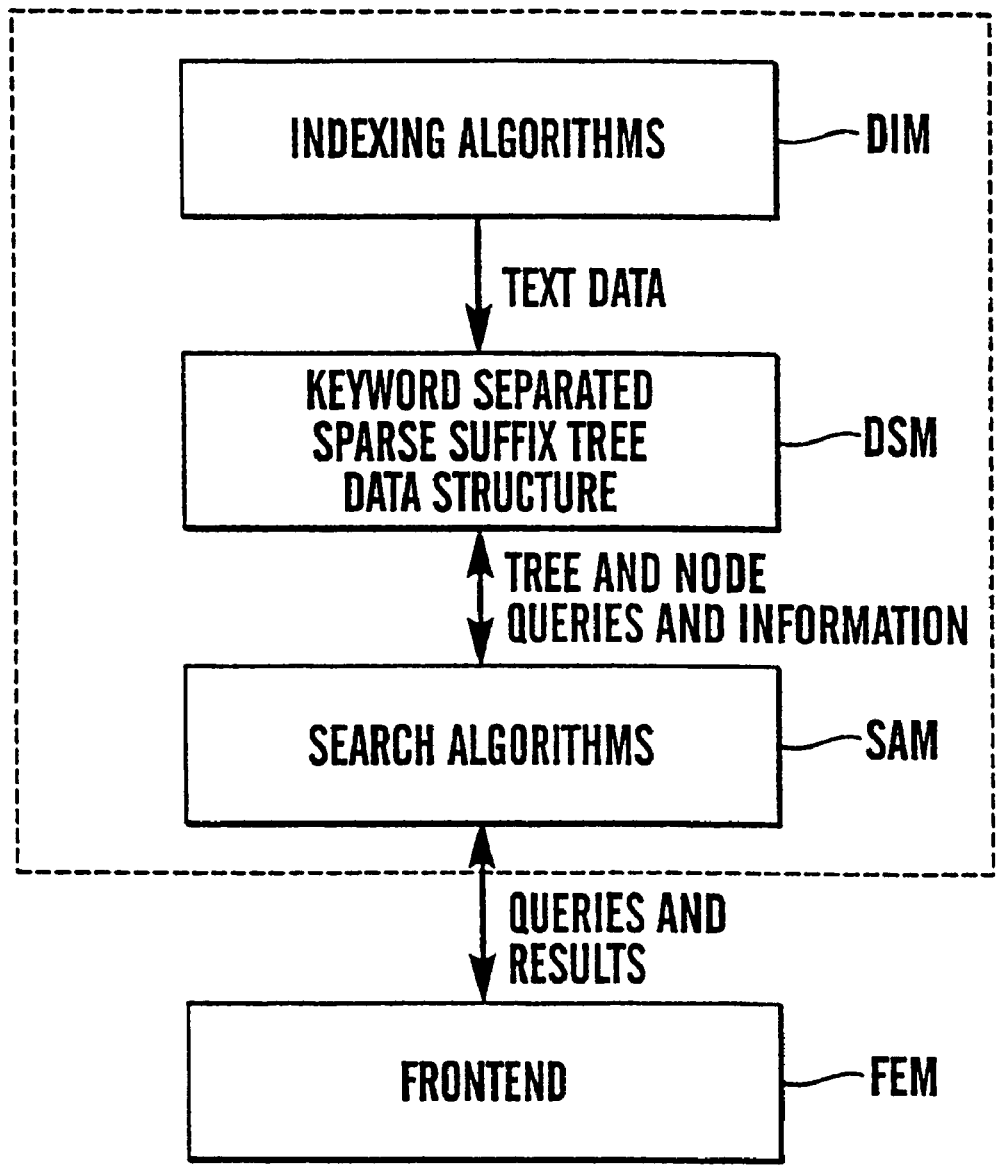

The four modules of the ASE works together to offer a complete search engine functionality. The data flow between the different modules is shown in FIG. 7. Indexing a collection of documents is done in the document indexing module DIM comprising indexing algorithms. This module is, of course, not a part of the search system according to the invention, but indexing algorithms that can be used are well-known in the art. The text found in the documents is passed on to the data storage DSM module for storage. The data storage module is, of course, a part of the search system according to the invention and is as stated based on the KWS tree structure. The search algorithm module SAM contains algorithms for searching the data located in the data storage module. This module implements the search system according to the present invention and allows for a search process querying the data structure for tree and node information, while maintaining state variables. The front-end module may for instance be implemented on a work station or a personal computer and the like, providing the functionality as stated above.

As already stated in the introduction, it is to be understood that the search system according to the invention can be implemented as software written in a suitable high-level language on commercially available computer systems, including workstations. It may also as stated be implemented in the form of a dedicated processor device which advantageously may comprise a large number of parallel processors being able to process large word sequences in parallel for approximate matching with a large number of query word sequences. The fixed operational parameters of the processor may then be entered in a low-level code, while keyword sequences input from the KWS tree structure allows for an extremely fast processing of queries on a huge amount of data, and the search system according to present invention shall hence in high degree be suited for performing searches on e.g. the World Wide Web, even in a KWS tree structure large enough to index all documents presently offered on the World Wide Web and moreover capable of handling the expected data volume growth on the World Wide Web in the future.

What is claimed is:

1. A search system for information retrieval, particularly information stored in form of text, wherein a text T comprises words and/or symbols s and sequences S thereof, wherein the information retrieval takes place with a given or varying degree of matching between a query Q, wherein the query Q comprises words and/or symbols q and sequences thereof P, and retrieved information R comprising words and/or symbols and sequences thereof from the text T, wherein the search system comprises a data structure for storing at least a part of the text T, and a metric M which measures the degree of matching between the query Q and retrieved information R, and wherein the search system implements search algorithms for executing a search, particularly a full text search on the basis of keywords kw, characterized in that the data structure comprises a tree structure in the form of a non-evenly spaced sparse suffix tree ST(T) for storing suffixes of words and/or symbols s and sequences S thereof in the text T, that the metric M comprises a combination of an edit distance metric D(s,q) for an approximate degree of matching between words and/or symbols s;q in respectively the text T and a query Q and an edit distance metric $D_{w,s}(S,P)$ for an approximate degree of matching between sequences S of words and/or symbols s in the text T and a query sequence P of words and/or symbols q in the query Q, the latter edit distance metric including weighting cost functions for edit operations which transform sequences of words and/or symbols s in the text T into the sequence P of words and/or symbols q in the query Q, the weighting taking place with a value proportional to a change in the length of the sequence S upon a transformation or dependent on the size of the words and/or symbols s;q in sequences S;P to be matched, that the implemented search algorithms comprise a first algorithm for determining the degree of matching between words and/or symbols s;q in the suffix tree representation of respectively the text T and a query Q, and a second algorithm for determining the degree of matching between sequences S;P of words and/or symbols s;q in the suffix tree representation of respectively the text T and the query Q, said first and/or second algorithms searching the data structure with queries Q in the form of either words, symbols, sequences of words or sequences of symbols or combinations thereof, such that information R is retrieved on the basis of query Q with a specified degree of matching between the former and the latter, and that the search algorithms optionally also comprise a third algorithm for determining exact matching between words and/or symbols s;q in the suffix tree representation of respectively the text T and the query Q and/or a fourth algorithm for determining exact matching between sequences S;P of words and/or symbols s;q in the suffix tree representation of respectively the text T and the query Q, said third and/or fourth algorithms searching the data structure with queries Q in the form of either words, symbols, sequences of words, or sequences of symbols or combinations thereof, such that information R is retrieved on the basis of the query Q with an exact matching between the former and the latter.

2. A search system according to claim 1, wherein the non-evenly spaced sparse suffix tree ST(T) is a word-spaced sparse suffix tree $SST_{ws}(T)$ comprising only a subset of the suffixes in the text T.

3. A search system according to claim 2, wherein the word-spaced sparse suffix tree $SST_{ws}(T)$ is a keyword-spaced sparse suffix tree $SST_{kws}(T)$.

4. A search system according to claim 3, wherein the first algorithm for detecting the degree of keyword matching in a keyword-spaced sparse suffix tree $SST_{kws}(T)$ is implemented in pseudo-code as follows:

FindApproximate (root,p,k)
    node←root;
    i←1;
        nodes←Children (node); // A stack of nodes
        for all v ∈ nodes do
        if IsLeaf (v) then
            for j←i to length (Suffix(node)) do
            $w_j$←Suffix(node)$_{j-i}$;
            if $w_j$='$' then // '$' is a stopchar
                output $W_{l,j}$;
                return;
            if EditDist (i)=∞ then
                break;
        else //Internal node
            i←i+1;
            $w_i$←label (v)
            if EditDist (i)=∞ then
                break;
            nodes←Children (v) ∪ nodes;
// end for
EditDistance(j) // Calculates jth row
    for i←1 to length (P) do
        if $p_i=w_j$ then ∂←0 else ∂←1;
        $c_1=D[i-1,j]+c_{ins}(m_j)$;
        $c_2=D[i,j-1]+c_{del}(p_i)$;
        $c_3=D[i-1,j-1]+c_{change}(p_i,m_j)$;
        $c_4=D[i-2,j-2]+c_{transpose}(p_i,m_{j-1})$;
        $D[i,j]←c_{fraction}(j/l)·\min(c_1,c_2,c_3,c_4)$;
    if D[i,j]>k
        return ∞; // No distance below k
    return D[i,j].

5. A search system according to claim 3, wherein the second algorithm for determining the degree of keyword sequence matching in a keyword-spaced sparse suffix tree $SST_{kws}(T)$ is implemented in code as follows:

ApproxSequenceMatch_ED (root, P(=$p_1,p_2,\ldots,P_m$),k)
    m←|p|
    matches←∅
    startError←0
    startIndex←1
    while startError≦k OR startIndex≦m do
        startNode←FindExact ($p_{startIndex}$);
        list←UnorderedOccurrenceList (startNode);
        for all v ∈ lists do
        if ApproxMatchRest2 (v,P,k,startError) then
        matches←∪v;
    startError←startError+$c_{del}$ ($p_{startIndex}$);
    startIndex←startIndex+1.

6. A search system according to claim 5, wherein the ApproxMatchRest subroutine of the second algorithm is implemented in pseudo-code as follows:

ApproxMatchRest (u,P,K,startError)
    error←startError;
    lastError←startError;
    column←O;
    node←u;
    for v←$p_2$ to $p_{|p|}$ do
        node←NextOccurrence(node);
        word←Keyword(node);
        lastError←error;
        error←startError+EditDistance (column);
        if error >k AND lastError >k then
            return false;
    return true;
EditDistance(j) // Calculates jth row
    for i←1 to length (P) do
        if $p_i=w_j$ then ∂←0 else ∂←1;
        $c_1=D[i-1,j]+c_{ins}(m_j)$;
        $c_2=D[i,j-1]+c_{del}(p_i)$;
        $c_3=D[i-1,j-1]+c_{change}(p_i,m_j)$;
        $c_4=D[i-2,j-2]+c_{transpose}(p_i,m_{j-1})$;
        $D[i,j]←c_{fraction}(j/l)·\min(c_1,c_2,c_3,c_4)$;
    if D[i,j]>k
        return ∞; // No distance below k
    return D[i,j].

7. A search system according to claim 3, wherein the third algorithm for determining an exact keyword matching in a keyword-spaced sparse suffix tree $SST_{kws}(I)$ is implemented in pseudo-code as follows:

FindExact (root,p)
    i←1;
    node←Find Child (root,$p_i$);
    while node AND i ≦length (p) do
        if IsLeaf(node) AND Suffix(node)=$P_i P_m$ then
        return node;
        i←i+1
    node←FindChild (node, $p_i$).

8. A search system according to claim 3, wherein the fourth algorithm for determining an exact keyword sequence matching in a keyword-spaced sparse suffix tree $SST_{kws}(T)$ is implemented in pseudo-code as follows:

MatchSequenceExact (P, root)
    matches←∅;
    v←FindExact ($p_1$,root);
    if |P|>1 then
        if v ? NIL then
        list←UnorderedOccurrenceList (v);
        for all u ∈ list do

```
            if NextKeyword(u)=p₂ then
                if MatchRest (p₃ pₘ,u) then
                    matches←matches ∪ Occurrence(u);
    return matches;
    MatchRest (P,u)
    node←u;
    for v←p_l to p_|p| do
        node←NextOccurrence(node);
        word←Keyword(node);
        if v≠word then
    return false.
```

9. The use of a search system according to claim 1 in an approximate search engine.

10. A method in a search system for information retrieval, particularly information stored in form of text, wherein a text T comprises words and/or symbols s and sequences S thereof, wherein the information retrieval takes place with a given or varying degree of matching between a query Q, wherein the query Q comprises words and/or symbols q and sequences P thereof, and retrieved information R comprising words and/or symbols and sequences thereof from the text T, wherein the search system comprises a data structure for storing at least a part of the text T, and a metric M which measures the degree of matching between the query Q and retrieved information R, and wherein the search system implements search algorithms for executing a search, particularly a full text search on the basis of keywords kw, wherein the information in the text T is divided into words s and word sequences S, the words being substrings of the entire text separated by word boundary terms and forming a sequence of symbols, and wherein each word is structured as a sequence of symbols, characterized by generating the data structure as a word-spaced sparse suffix tree $SST_{ws}(T)$ of a text T for representing all the suffixes starting at a word separator symbol in the text T, storing sequence information of the words s in the text T in the word-spaced sparse suffix tree $SST_{ws}(T)$, generating a combined edit distance metric M comprising an edit distance metric $D(s,q)$ for words s in the text T and a query word q in a query Q and a word-size dependent edit distance metric $D_{ws}(S,P)$ for sequences S of words s in the text T and a sequence P of words q in the query Q, the edit distance metric $D_{ws}(S,P)$ being the minimum sum of costs for edit operations transforming a sequence S into the sequence P, the minimum sum of costs being the minimum sum of cost functions for each edit operation weighted by a value proportional to the change in the total length of the sequence S or by the ratio of the current word length and average word length in the sequences S;P, and determining the degree of matching between words s,q by calculating the edit distance $D(s,q)$ between the words s of the retrieved information R and the word q of a query Q, or in case the words s,q are more than k errors from each other, determining the degree of matching between the word sequences $S_R$; $P_Q$ of retrieved information R and a query Q respectively by calculating the edit distance $D_{ws}(S_R,P_Q)$ for all matches.

11. The method according to claim 10, further comprising additionally weighting an edit operation which changes a word s into word q with a parameter for the proximity between the characters of the words s;q, thus taking the similarity of the words s;q in regard when determining the cost of the edit operation in question.

12. The method according to claim 10, further comprising limiting the number of matches by calculating the edit distance $D_{ws}(S_R,P_Q)$ for restricted number of words in the query word sequence $P_Q$.

13. A method according to claim 10, further comprising defining the edit distance $D(s,q)$ between words s and a word q recursively and calculating the edit distance $D(s,q)$ by means of a dynamic programming procedure.

14. A method according to claim 10, further comprising defining the edit distance $D_{ws}(S,P)$ between sequences S and a sequence P recursively and calculating the edit distance $D_{ws}(S,P)$ by means of a dynamic programming procedure.

* * * * *